2,948,652
Patented Aug. 9, 1960

2,948,652

WET STRENGTH PAPER CONTAINING LINEAR POLYAMIDE RESIN

Yun Jen, Anaheim, Calif., and Ronald R. House, Darien, Conn., assignors to American Cyanamid Company, New York, N.Y., a corporation of Maine No Drawing. Filed June 9, 1958, Ser. No. 740,534

8 Claims. (Cl. 162—166)

The present invention relates to paper of improved wet and dry strength composed of a web of interfelted waterlaid fibers having a uniformly adsorbed content of a normally water-soluble cationic thermosetting amide-containing linear polymer, as more particularly hereinafter described. The invention includes methods for manufacturing paper.

The discovery has now been made that paper of improved wet and dry strength can be made by forming a dilute aqueous suspension of cellulose papermaking fibers, adding thereto a small amount as strengthening agent of a water-soluble cationic thermosetting methylene - bisacrylamide - alkylenepolyamine - cyanate - formaldehyde resin, sheeting the fibers to form a waterlaid web, and drying the web by heating in the range of 190° F.–250° F.

The methylenebisacrylamide - alkylenepolyamine - cyanate-formaldehyde resin may be added according to the present invention at any convenient point in the papermaking system without change in established operating procedures. Thus, it may be added directly to a pulp of untreated papermaking cellulose fibers or it may be added to a pulp of such fibers which have previously been sized by the action of rosin size and alum thereon.

The paper of the present invention is composed of a web of interfelted waterlaid fibers wherein the fiber-to-fiber bonds are strengthened by a small but effective uniformly adsorbed content of a resin of the type described. The resin is normally water-soluble but is present in the paper in water-insoluble thermoset form and acts to "spot-weld" the individual fibers together. The paper may have a pH in the range of 4.5 to 8.5 and in addition may contain rosin size and fillers, dyes and pigments as is customary.

The paper of the present application in unsized form is suitable for use as paper towelling and, when sized, as map paper and as writing paper.

In the process, best results in terms of wet and dry strength imparted are obtained when the papermaking system during and after addition of the resin is on the acid side, for example, in the range of 4.5 to 6. However, the decrease in strength effected by increased alkalinity of the system, up to about pH 8.5 is slight. The process includes the step of adding acid sensitive fillers for example calcium carbonate.

A perceptible strengthening effect occurs when the resin is added in amounts as small as 0.1% based on the dry weight of the fibers, and the improvement effected per increment of resin added is slight when more than 3% to 5% is added on the same basis. The development of paper of excellent wet strength without waste of resin generally occurs in the range 0.5%–1.5% of resin based on the dry weight of the fibers and accordingly this is regarded as the preferred practical range.

The resin develops its maximum wet strength properties only after cure and consequently heating in the range of 190° F.–250° F. is necessary for the purpose. Sufficient cure takes place when the wet web is dried on steam-heated rolls in accordance with normal papermaking practice for ½ to 3 minutes.

The resins referred to are made by reacting a water-soluble methylenebisacrylamide - alkylenepolyamine condensation product having a Gardner-Holdt viscosity of at least B as a 33% by weight aqueous solution at 25° C. first with sufficient of a water-soluble metal cyanate to carbamylate substantially all, i.e., at least about 80%, of the primary and secondary amino groups therein and then with sufficient formaldehyde to convert the product to thermosetting form.

The parent methylenebisacrylamide-alkylenepolyamine condensation product is prepared by heating a water-soluble methylenebisacrylamide, for example, methylenebisacrylamide itself, methylenebismethacrylamide, N,N'-dimethyl methylenebisacrylamide, and N,N'-dihydroxymethyl methylenebisacrylamide, with an alkylenepolyamine, for example, ethylenediamine, trimethylenediamine, and the water-soluble polyalkylenepolyamines including diethylenetriamine, tetraethylenepentamine and the corresponding polypropylenepolyamines, in about equal molecular proportions until the solution has attained at least the minimum molecular size specified by the viscosity given above. The effectiveness of the condensation product as the raw material increasees rapidly as its viscosity rises, and consequently we prefer to continue the reaction until the product reaches a viscosity of N at 33% solids and 25° C. On the other hand, it is within the scope of the invention to continue the reaction until the product is substantially at the non-pumpable gel stage.

The condensation product is then reacted with the water-soluble metal cyanate and is then reacted with formaldehyde so as to convert the product to thermosetting form. The carbamylation reaction proceeds at 60°–80° C., and sodium and potassium cyanates are suitable. The amount of formaldehyde reacted in each instance to render the resin thermosetting varies with the proportion of amine nitrogen groups to amide nitrogen groups and in general at least sufficient formaldehyde should be employed to methyloate at least about 67% of such groups. The minimum effective amount in any instance can be found by trial. The efficiency of the polymer rises with the amount of formaldehyde employed and we consequently prefer to methylolate substantially all of the amino nitrtogen groups present including any formaldehyde-reactive amide groups present.

The product is a clear, readily water-soluble syrup which is rapidly and substantively adsorbed by cellulose fibers.

The invention will be more particularly described with respect to the examples which follow. These examples are specific embodiments of the invention and are not to be construed as limitation thereon.

*Example 1*

The following illustrates the preparation of paper of improved wet and dry strength according to the present invention.

The resin was prepared by dissolving 66 gm. (0.5 mol) of 3,3'-iminobispropylamine and 56 gm. (0.45 mol) of methylenebisacrylamide in 270 cc. of water, heating the mixture at 95° C. for 80 minutes until the syrup had a viscosity of E on the Gardner-Holdt scale determined at 25° C. and 33% solids, acidifying to pH 1.5 with concentrated aqueous hydrochloric acid, heating at 70° C. for 15 minutes with 129 gm. (1.5 mol) of potassium cyanate, and finally heating at 75° C. for 20 minutes with 243 cc. (3 mols) of 37% aqueous formaldehyde.

The product was a clear syrup which was diluted to 6% solids with water for use.

The paper was prepared by forming an aqueous suspension at 0.6% consistency from bleached northern kraft pulp beaten to a Green freeness of 500 ml., taking aliquots therefrom, adding the above resin in amounts shown in the table below, adjusting the pH of the values shown, gently stirring the pulp aliquots for three minutes, sheeting the samples on a Nash handsheet machine at a basis weight of 45–50 lbs. (25″ x 40″/500 ream), and determining the dry and wet tensile strength of the sheets by the TAPPI method.

Results are as follows:

| Run No. | Percent Resin Added [1] | Pulp pH | Tensile Strength, Lb./inch | |
|---|---|---|---|---|
| | | | Dry | Wet |
| 1 | None | 4.5 | 25.0 | <0.6 |
| 2 | None | 7.0 | 25.2 | <0.6 |
| 3 | 0.1 | 4.5 | 26.3 | 1.5 |
| 4 | 0.5 | 4.5 | 28.8 | 4.0 |
| 5 | 1.0 | 4.5 | 29.7 | 6.2 |
| 6 | 3.0 | 4.5 | 31.8 | 10.8 |
| 7 | 0.1 | 8.0 | 25.8 | 1.2 |
| 8 | 0.5 | 8.0 | 28.2 | 3.3 |
| 9 | 1.0 | 8.0 | 29.5 | 5.1 |
| 10 | 3.0 | 8.0 | 30.3 | 8.6 |

[1] Based on dry weight of the fibers.

*Example 2*

The following illustrates the results obtained with another resin according to the present invention.

Into a reaction vessel equipped with stirrer and thermometer is charged 231 gm. of methylenebisacrylamide (1.5 mols), 146 gm. of triethylenetetramine (1.0 mol), and 554.5 cc. of water. The reaction was carried out at 25°–30° C. with stirring for 39 minutes at which time the viscosity of the syrup, adjusted to a solids content of 33%, was T at 25° C. Sufficient amount of hydrochloric acid was added to convert the amino groups to amine hydrochloride groups. The mixture was then reacted with 275 gm. of potassium cyanate at 50° C. for 50 minutes and the product reacted with 350 cc. of 37% aqueous formaldehyde at 70°–80° C. for 30 minutes.

The wet strength properties of the resin were determined by the method of Example 1 with the following results.

| Run No. | Percent Resin Added [1] | Pulp pH | Tensile Strength, Lb./inch | |
|---|---|---|---|---|
| | | | Dry | Wet |
| 1 | 2 | 4.5 | 32.1 | 10.2 |
| 2 | 2 | 6.0 | 31.7 | 9.4 |
| 3 | 2 | 7.0 | 31.1 | 8.5 |
| 4 | 2 | 7.5 | 30.3 | 8.0 |
| 5 | 2 | 8.0 | 30.0 | 7.4 |

[1] Based on dry weight of the fibers.

We claim:

1. Paper of improved wet and dry strength composed of a web of interfelted waterlaid fibers wherein the fiber-to-fiber bonds are strengthened by a small but effective uniformly adsorbed content of a normally water-soluble cationic thermosetting methylenebisacrylamide-alkylenepolyamine-cyanate-formaldehyde resin in thermoset form, said resin being prepared by reacting a water-soluble methylenebisacrylamide-alkylenepolyamine condensation product having a Gardner-Holdt viscosity of at least B as a 33% by weight aqueous solution of at 25° C. first with sufficient of a water-soluble metal cyanate to carbamylate at least 80% of all primary and secondary amino groups therein, and then with sufficient formaldehyde to convert the product to thermosetting form.

2. Paper according to claim 1 wherein the resin is prepared from a methylenebisacrylamide-3,3′-iminobispropylamine condensation product.

3. Paper according to claim 1 wherein the resin is prepared from a methylenebisacrylamide-alkylenepolyamine condensation product having a Gardner-Holdt viscosity of at least N as a 33% by weight aqueous solution at 25° C.

4. Paper according to claim 1 wherein the fibers are rosin-sized fibers.

5. Process of making paper of improved wet and dry strength which comprises forming a dilute aqueous slurry of cellulose papermaking fibers, adding thereto a small but effective amount as strengthening agent of a water-soluble cationic thermosetting methylenebisacrylamide-alkylenepolyamine-cyanate-formaldehyde resin, said resin being prepared by reacting a water-soluble methylenebisacrylamide-alkylenepolyamine condensation product having a Gardner-Holdt viscosity of at least B as a 33% by weight aqueous solution at 25° C. first with sufficient of a water-soluble metal cyanate to carbamylate at least 80% of all primary and secondary nitrogen atoms therein and then with sufficient formaldehyde to convert said carbamylated condensation product to thermosetting form, sheeting said fibers to form a web, and heating said web at 190°–250° F. to dry the same and develop the strengthening properties of the resin thereon.

6. A process according to claim 5 wherein the fibers are sized by addition of rosin size and alum to the slurry prior to addition of the resin.

7. A process according to claim 5 wherein the weight of resin added is about 0.1% to 1% of the dry weight of the fibers.

8. A process according to claim 5 wherein the pH of the slurry of papermaking fibers is alkaline.

References Cited in the file of this patent

UNITED STATES PATENTS

| 2,475,846 | Lundberg | July 12, 1949 |
| 2,576,502 | Dalton | Nov. 27, 1951 |
| 2,769,797 | Suen | Nov. 6, 1956 |
| 2,801,169 | Lundberg et al. | July 30, 1957 |
| 2,834,756 | Suen et al. | May 13, 1958 |